UNITED STATES PATENT OFFICE.

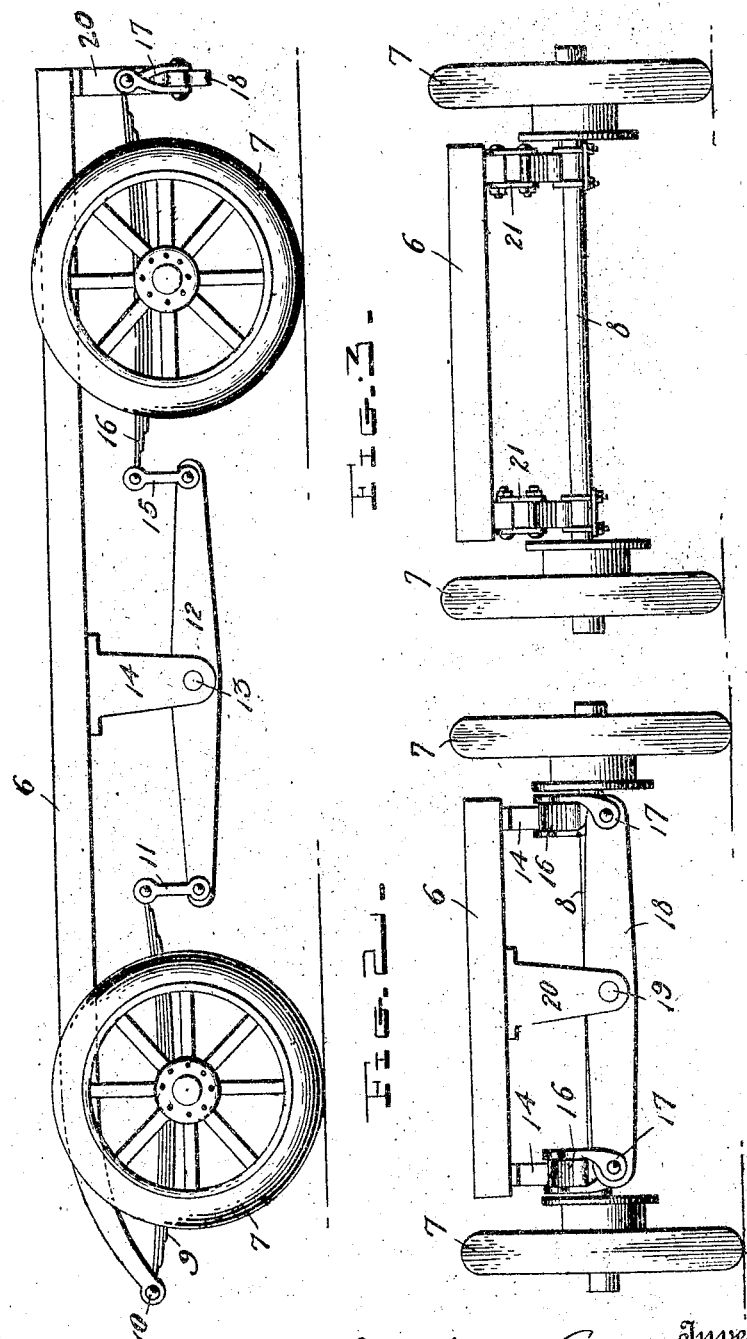

JACOB O. LEWIS, OF CHICAGO, ILLINOIS.

VEHICLE-SPRING.

No. 865,599.　　　　Specification of Letters Patent.　　Patented Sept. 10, 1907.

Application filed December 18, 1906. Serial No. 348,429.

*To all whom it may concern:*

Be it known that I, JACOB O. LEWIS, a citizen of the United States, residing at Chicago, in the county of Cook and State of Illinois, have invented new and useful Improvements in Vehicle-Springs, of which the following is a specification.

This invention relates to vehicle springs or spring gear, and is particularly useful in connection with automobiles.

The object of the invention is to form a spring gear or arrangement which will reduce the jar or shock incident to impact or riding on rough roads by equalizing or distributing the shock received by any spring or springs among the other springs of the vehicle, so as to relieve such first-mentioned spring or springs of the whole strain or shock. This object is effected by connecting two or more of the various springs of the vehicle in such manner that a shock received by one will be distributed to the other or others and in which the load in one particular part of the vehicle is not carried wholly by the springs directly thereunder but is partially carried and sustained by the other springs.

An embodiment of the invention is illustrated in the accompanying drawings, in which Figure 1 is a side elevation. Fig. 2 is a rear elevation. Fig. 3 is a modification.

Referring specifically to the drawings, 6 indicates the chassis or body frame of an automobile or other vehicle, and 7 the wheels thereof mounted upon axles 8. The springs are preferably semi-elliptic, as shown, the front springs 9 being arranged longitudinally with respect to the frame, and connected at their front ends, as at 10, to the front ends of the side bars of the frame. The rear end of each front spring 9 is connected by a swinging shackle or hanger 11 to one end of an equalizing or distributing lever 12, which is fulcrumed at 13 to a bracket 14 depending from the side bar of the frame at or about the middle thereof. Said lever is arranged lengthwise under the frame, and is connected at its rear end by means of a swinging shackle 15, to the front end of the semi-elliptic springs 16. These springs are mounted upon the axles in the usual manner.

The rear ends of the rear springs 16 are connected by shackles 17 to the opposite ends respectively of a cross lever 18 which is fulcrumed at 19 to a depending bracket 20 at the middle of the rear bar or part of the frame. It will be seen that the weight is carried or transmitted at the connections 10 at the front ends of the frame, the side brackets 14, and the rear bracket 20. The springs at each side are connected through the medium of the levers 12, and any vibration of movement of either of said side springs incident to shock or strain is transmitted or distributed by means of the lever from one spring to the other. Also, the springs on the opposite sides are connected at the rear ends by means of the cross lever 18. Any particular part or corner of the weighted body is thus not carried alone by the spring directly thereunder, but is carried in part by the other springs, or rather the whole weight however placed upon the body, is carried in equalizing proportions by all the springs thereunder. It follows then that shock or impact at any particular part or upon any particular wheel is not sustained wholly by the spring at said wheel but is distributed among all the springs. Thus, on impact against one of the front wheels the spring at that corner is flexed, and the movement or shock is transmitted by means of the side lever to the rear spring on the same side, and also by means of the cross lever to the springs on the opposite side. The same is true with respect to any other wheel. When the two front wheels strike an obstruction the whole shock is not sustained by the front springs, but, the weight carried by the brackets is applied to and sustained by both the front and the rear springs; and the same is true when the rear wheels strike an obstruction. Accordingly all the springs play a part at all times in sustaining or absorbing the shock applied to one or more of the wheels. This gives a very smooth and easy riding spring gear, reducing shocks and jolts to a minimum and also distributing the same so that there is little liability of undue strain of a spring even during very rough riding.

In the modification shown in Fig. 3, the rear ends of the rear springs, instead of being connected to a cross lever, are connected directly to the rear of the frame, by swinging shackles or connections as indicated at 21 in said figure. This gives an equalizing and distributing connection between the respective springs on each side, and is attended with the advantage of the distribution of strain between the front and rear springs at each side and the absorption by both of a shock at either.

The invention is not limited to the exact arrangement or manner of connection of the various springs as shown, but may be modified within the scope of the invention and the scope of the following claims.

I claim:

1. A vehicle having, in combination, front and rear axles, springs carried on said axles at each side of the vehicle body, and a cross lever fulcrumed at the middle under the vehicle frame and connecting springs on opposite sides to distribute shock or strain received by a spring on one side to the spring on the other.

2. A vehicle having, in combination, front and rear axles, springs carried on said axles at each side of the vehicle body; a lever connecting the springs on each side, and a lever connecting the springs on opposite sides, to distribute shock or strain received by springs on either side among the springs on both sides.

3. In a vehicle, the combination of longitudinal springs carried on the front and rear axles at each side of the vehicle body, the front springs being connected at their front ends to the vehicle body, a lever fulcrumed on the vehicle body at each side thereof and connected at its respective ends to the rear end of the front spring and the front end of the rear spring, and a cross lever fulcrumed on the vehicle body and connected at its ends to the rear ends of the rear springs.

In testimony whereof I have signed my name to this specification in the presence of two subscribing witnesses.

JACOB O. LEWIS.

Witnesses:
 NELLIE FELTSKOG,
 H. G. BATCHELOR.